(12) United States Patent
Bast et al.

(10) Patent No.: US 12,058,995 B2
(45) Date of Patent: Aug. 13, 2024

(54) SYSTEM AND METHOD FOR CONTROLLING THE GROUND SPEED OF AN AGRICULTURAL SPRAYER

(71) Applicant: CNH Industrial America LLC, New Holland, PA (US)

(72) Inventors: Brent David Bast, Sioux Falls, SD (US); Scott Allen Long, Plainfield, IL (US); Nathan Paul Brooks, Manitowoc, WI (US); Steven Winkel, Elkhart Lake, WI (US)

(73) Assignee: CNH Industrial America LLC, New Holland, PA (US)

( * ) Notice: Subject to any disclaimer, the term of this patent is extended or adjusted under 35 U.S.C. 154(b) by 700 days.

(21) Appl. No.: 17/179,688

(22) Filed: Feb. 19, 2021

(65) Prior Publication Data
US 2022/0264861 A1 Aug. 25, 2022

(51) Int. Cl.
*A01M 7/00* (2006.01)
*A01C 23/00* (2006.01)
*A01C 23/04* (2006.01)

(52) U.S. Cl.
CPC ......... *A01M 7/0089* (2013.01); *A01C 23/007* (2013.01); *A01C 23/047* (2013.01); *A01M 7/0042* (2013.01)

(58) Field of Classification Search
CPC ............. B60W 2520/01; B60W 20/00; B60W 2556/50; B60W 2510/0638;
(Continued)

(56) References Cited

U.S. PATENT DOCUMENTS 6,749,128 B1 6/2004 Oosterman
9,510,525 B2 12/2016 Schmidt
(Continued)

FOREIGN PATENT DOCUMENTS

CN 201660864 12/2010
CN 103891696 8/2015
WO WO 1997016964 5/1997

OTHER PUBLICATIONS

New Holland Agriculture Guardian™ Self-Propelled Front Boom Sprayers, dated 2018 (12 pages) https://assets.cnhindustrial.com/nhag/nar/en-us/assets/pdf/spraying-equipment/sp310f-sp370f-sp410f-sprayers-brochure-us-en.pdf.
(Continued)

*Primary Examiner* — Khoi H Tran
*Assistant Examiner* — Nhi Q Bui
(74) *Attorney, Agent, or Firm* — Rebecca Henkel; Peter K. Zacharias; Rickard K. DeMille

(57) ABSTRACT

A system for controlling a ground speed of an agricultural sprayer includes one or more sensors configured to capture data indicative of first and second application variables and a computing system communicatively coupled to the one or more sensors. In this respect, the computing system configured to determine the first and second application variables based on the data captured by the one or more sensors. Additionally, the computing system is configured to determine a spray quality index associated with the dispensing of an agricultural fluid onto a field by the agricultural sprayer based on the determined first and second application variables. Moreover, the computing system is configured to control the ground speed at which the agricultural sprayer travels across the field based on the determined spray quality index.

20 Claims, 5 Drawing Sheets

(58) Field of Classification Search
CPC ......... B60W 40/105; B60W 2520/105; B60W 2720/10; B60W 30/146; B60W 2300/15; G05D 1/0088; G05D 1/0223; G05D 2201/0201; A01M 7/0089; A01M 7/0042; A01C 23/007; A01C 23/047

See application file for complete search history.

(56) References Cited

U.S. PATENT DOCUMENTS

| | | | |
|---|---|---|---|
| 10,195,618 | B2 | 2/2019 | Haviland |
| 10,238,098 | B2 | 3/2019 | Leeb |
| 10,773,271 | B2 | 9/2020 | Funseth et al. |
| 2004/0215353 | A1* | 10/2004 | Frerichs ............... G05B 23/024 |
| | | | 700/20 |
| 2013/0103211 | A1* | 4/2013 | Peterson ............. A01B 79/005 |
| | | | 700/284 |
| 2015/0375247 | A1* | 12/2015 | Funseth ................... B05B 1/20 |
| | | | 239/69 |
| 2016/0368011 | A1* | 12/2016 | Feldhaus ............... B05B 12/124 |
| 2017/0094894 | A1* | 4/2017 | Heim ..................... A01C 5/064 |
| 2018/0281798 | A1* | 10/2018 | Kremmer ............ A01M 7/0089 |
| 2019/0351434 | A1* | 11/2019 | Smith .................. B05B 12/124 |
| 2021/0127567 | A1 | 5/2021 | Loukili et al. |

OTHER PUBLICATIONS

Wolf, Rate Controllers and Spray Pressure, Sprayers 101, dated Apr. 22, 2015 (7 pages) https://sprayers101.com/rate-controller-pressure/.

Kees, Field Evaluation of a Constant-Rate Herbicide Sprayer for ATV's and UTV'USDA Forest Service, Missoula, MT, dated 2008 (23 pages).

* cited by examiner

SYSTEM AND METHOD FOR CONTROLLING THE GROUND SPEED OF AN AGRICULTURAL SPRAYER

FIELD OF THE INVENTION

The present disclosure generally relates to agricultural sprayers and, more particularly, to systems and methods for controlling the ground speed of an agricultural sprayer.

BACKGROUND OF THE INVENTION

Agricultural sprayers apply an agricultural fluid (e.g., a pesticide, a nutrient, and/or the like) onto crops as the sprayer is traveling across a field. To facilitate such travel, sprayers are configured as self-propelled vehicles or implements towed behind an agricultural tractor or other suitable work vehicle. A typical sprayer includes a boom assembly on which a plurality of spaced apart nozzles is mounted. Each nozzle is configured to dispense or otherwise spray a fan of the agricultural fluid onto underlying crops and/or field surface.

In general, it desirable to apply agricultural fluids to the field uniformly and at a target application rate to facilitate the desired agricultural outcome (e.g., a reduction in weed coverage or pest activity). To achieve this, the agricultural fluids must be dispensed with a particular spray quality. For example, the spray fan dispensed by each nozzle may need to have specific parameters (e.g., a width or shape) such that the droplets of the agricultural fluid dispensed by the nozzle are uniformly deposited on a desired portion of the underlying plants or field surface at the target application rate. However, when certain conditions occur within the field (e.g., high winds) or the vehicle is traveling in a certain manner (e.g., traveling too fast or making a turn), the spray quality may degrade. When spray quality deteriorates in a portion of the field, the desired agricultural outcome may not be achieved.

Accordingly, an improved system and method for controlling the ground speed of an agricultural sprayer would be welcomed in the technology. In particular, a system and method for controlling the ground speed of an agricultural sprayer that improves spray quality as field conditions vary would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling a ground speed of an agricultural sprayer. The system includes a boom assembly and nozzle supported on the boom assembly, with the nozzle configured to dispense an agricultural fluid onto a field across which the agricultural sprayer is traveling. Furthermore, the system includes one or more sensors configured to capture data indicative of first and second application variables and a computing system communicatively coupled to the one or more sensors. In this respect, the computing system configured to determine the first and second application variables based on the data captured by the one or more sensors. Additionally, the computing system is configured to determine a spray quality index associated with the dispensing of the agricultural fluid onto the field based on the determined first and second application variables. Moreover, the computing system is configured to control the ground speed at which the agricultural sprayer travels across the field based on the determined spray quality index.

In another aspect, the present subject matter is directed to a method for controlling a ground speed of an agricultural sprayer. The agricultural sprayer, in turn, includes a boom assembly and a nozzle supported on the boom assembly, with the nozzle configured to dispense an agricultural fluid onto a field across which the agricultural sprayer is traveling. The method includes receiving, with a computing system, sensor data indicative of first and second application variables. Furthermore, the method includes determining, with the computing system, the first and second application variables based on the received sensor data. Additionally, the method includes determining, with the computing system, a spray quality index associated with the dispensing of the agricultural fluid onto the field based on the determined first and second application variables. Moreover, the method includes controlling, with the computing system, the ground speed at which the agricultural sprayer travels across the field based on the determined spray quality index.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
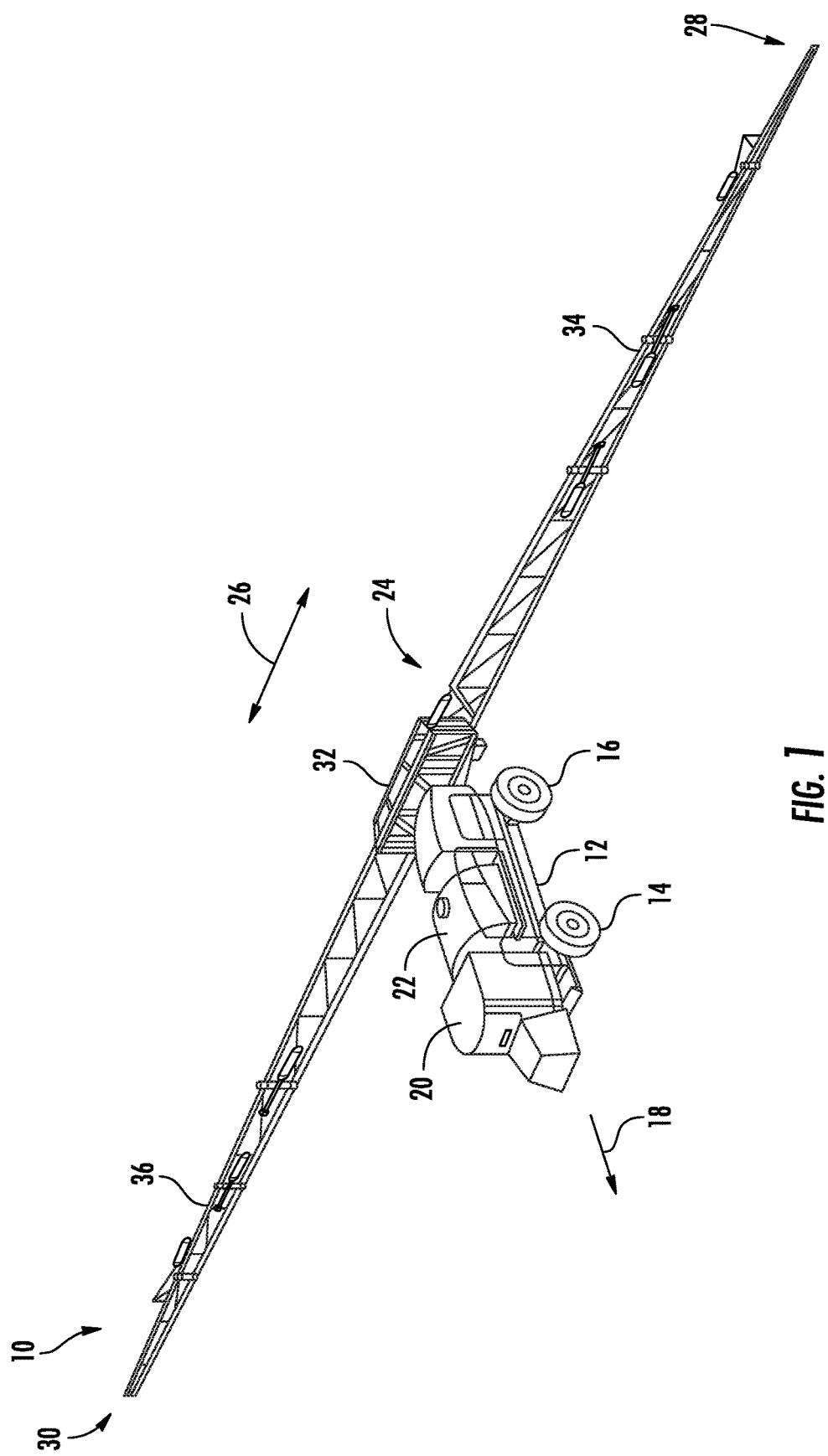
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and method for controlling the ground speed of an agricultural sprayer. As will be described below, the agricultural sprayer may include a boom assembly and one or more nozzles supported on the boom assembly. In this respect, as the agricultural sprayer travels across a field to perform a sprayer operation thereon, the nozzle(s) may be configured to spray or otherwise dispense an agricultural fluid (e.g., a pesticide, a nutrient, and/or the like) onto the field.

In several embodiments, a computing system may be configured to control the speed at which the agricultural sprayer travels across the field based on a spray quality index associated with the dispensing of the agricultural fluid. More specifically, the computing system may determine first and second application variables based on received sensor data. For example, the application variables may include the application rate, flow rate, and/or pressure of the agricultural fluid; the ground speed, acceleration/deceleration, and/or turning radius of the sprayer; a weather parameter(s); a boom movement parameter(s); and/or the like. The computing system may then determine the spray quality index based on the determined first and second application variables. The spray quality index may, in turn, provide an indication of the quality of the spraying operation being performed on the field. Thereafter, in some embodiments, the computing system may compare the determined spray quality index to a predetermined range. As such, when the determined spray quality index falls outside of the predetermined range, the computing system may initiate an adjustment of the ground speed at which the agricultural sprayer travels across the field.

Controlling the ground speed of the agricultural sprayer based on the determined spray quality index may ensure that the desired spray quality is maintained as sprayer travels across the field and field conditions change. By maintaining the desired spray quality as conditions within the field vary (e.g., wind speed), the agricultural fluid may be dispensed uniformly and at target application rate through the field. In this respect, controlling the ground speed of the agricultural sprayer based on the determined spray quality index may improve agricultural outcomes.

Referring now to the drawings, FIG. 1 illustrates a perspective view of one embodiment of an agricultural sprayer 10. In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated implement (e.g., a towable sprayer, an inter-seeder, a side-dresser, and/or the like).

As shown in FIG. 1, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in a direction of travel (indicated by arrow 18) across the field. Furthermore, the frame 12 may support a cab 20 and a tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may have any other suitable configuration. For example, in one embodiment, the front wheels 14 of the sprayer 10 may be driven in addition to or in lieu of the rear wheels 16.

Additionally, the sprayer 10 may include a boom assembly 24 mounted on the frame 12. In general, the boom assembly 24 may extend in a lateral direction (indicated by arrow 26) between a first lateral end 28 and a second lateral end 30, with the lateral direction 26 being perpendicular to the direction of travel 18. In one embodiment, the boom assembly 24 may include a center section 32 and a pair of wing sections 34, 36. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30. As will be described below, a plurality of spray nozzles 38 (FIG. 2) may be mounted on the boom assembly 24 and configured to dispense the agricultural fluid stored in the tank 22 onto the underlying field. However, in alternative embodiments, the boom assembly 24 may have any other suitable configuration.

Figure 2:
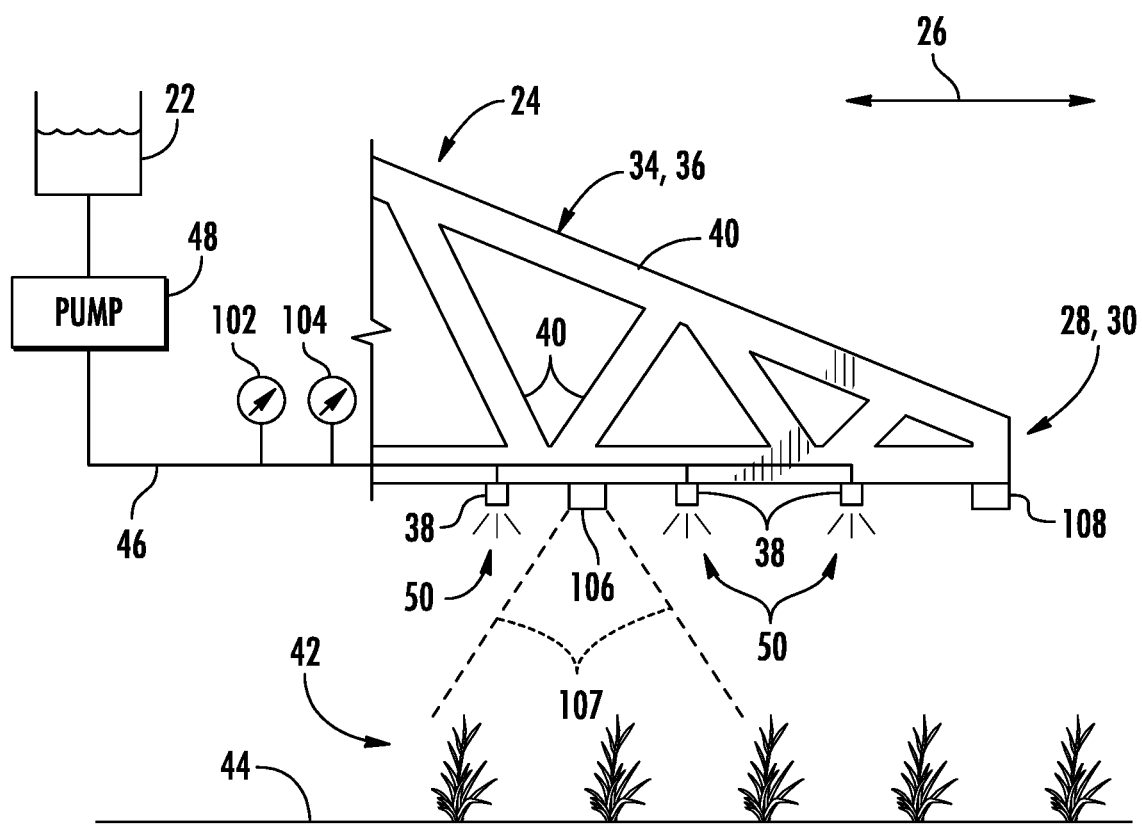
FIG. 2 illustrates a partial front view of one embodiment of a boom assembly of an agricultural sprayer in accordance with aspects of the present subject matter.

FIG. 2 illustrates a partial front view of one embodiment of a boom assembly 24 of the sprayer 10. In general, the boom assembly 24 may include a plurality of structural frame members 40, such as beams, bars, and/or the like. Moreover, as mentioned above, the boom assembly 24 may support a plurality of spray nozzles 38 (also referred to as spray tips). Each nozzle 38 may, in turn, be configured to dispense the agricultural fluid stored within the tank 22 onto underlying crops 42 or an underlying field surface 44. Specifically, as shown, the nozzles 38 are mounted on and/or coupled to the frame members 40 such that the nozzles 38 are spaced apart from each other in the lateral direction 26. Furthermore, a fluid conduit(s) 46 may fluidly couple the nozzles 38 to the tank 22. Moreover, a pump 48 may be configured to receive agricultural fluid from the tank 22 and supply a pressurized flow of the agricultural fluid to the nozzles 38. In this respect, as the sprayer 10 travels across the field in the direction of travel 18 to perform a spraying operation thereon, each nozzle 38 may dispense or otherwise spray a fan 50 of the agricultural fluid. The dispensed agricultural fluid may, in turn, be deposited onto the underlying crops 42 or field surface 44 in the form of droplets.

It should be further appreciated that the configuration of the agricultural sprayer 10 described above and shown in FIGS. 1 and 2 is provided only to place the present subject matter in an exemplary field of use. Thus, it should be appreciated that the present subject matter may be readily adaptable to any manner of agricultural sprayer configuration.

As shown in FIG. 2, the agricultural sprayer 10 may include one or more pressure sensors 102. In general, the pressure sensor(s) 102 may be configured to capture data indicative of the pressure of the agricultural fluid being supplied to the nozzles 38. As such, the pressure sensor(s) 102 may be provided in fluid communication with one of the fluid conduit(s) 46. For example, the pressure sensor(s) 102 may correspond to a diaphragm pressure sensor(s), a piston pressure sensor(s), a strain gauge-based pressure sensor(s), an electromagnetic pressure sensor(s), and/or the like.

Additionally, the agricultural sprayer 10 may include one or more flow rate sensors 104. In general, the flow rate sensor(s) 104 may be configured to capture data indicative of the flow rate of the agricultural fluid being supplied to the nozzles 38. As such, the flow rate sensor(s) 104 may be provided in fluid communication with one of the fluid conduit(s) 46. For example, the flow rate sensor(s) 104 may correspond to a gear flow meter(s), a piston flow meter(s), a venturi flow meter(s), and/or the like.

Moreover, the agricultural sprayer 10 may include one or more spray sensors 106. In general, the spray sensor(s) 106 may be configured to capture data associated with the spray fans 50 and/or the deposition of the agricultural fluid dispensed by the nozzles 38 onto the underlying plants 42 and/or field surface 44. For example, such data may be indicative of the application rate of the agricultural fluid onto the plants/field 42/44, one or more characteristics of the spray fans 50 (e.g., the width of the spray fans 50), the droplet distribution on of the agricultural fluid onto the plants/field 42/44, and/or the like.

In several embodiments, the spray sensor(s) 106 may correspond to one or more imaging devices. In such embodiments, each spray sensor 106 may be coupled to or mounted on the boom assembly 24 such that the one or more nozzles 38, associated spray fans 50, and/or portions of the underlying plants/field 42/44 are positioned within an associated field of view (indicated by dashed lines 107 in FIG. 2). As such, each spray sensor 106 may be configured to capture image data depicting the corresponding nozzles 38, spray fans 50, and/or portions of the underlying plants/field 42/44.

In such embodiments, the imaging device(s) may correspond to any suitable sensing device(s) configured to detect or capture images or other image-like data associated with the spray fans present within its field of view 107. For example, in several embodiments, the imaging device(s) may correspond to a suitable camera(s) configured to capture three-dimensional images of the nozzles 38, the spray fans 50, and/or portions of the plants/field surface 42/44 present within its field of view 107. For instance, in a particular embodiment, the imaging device(s) may correspond to a stereographic camera(s) having two or more lenses with a separate image sensor for each lens to allow the camera(s) to capture stereographic or three-dimensional images. However, in alternative embodiments, the imaging device(s) may correspond to any other suitable sensing device(s) configured to capture image or image-like data, such as a monocular camera(s), a LIDAR sensor(s), and/or a RADAR sensor(s).

Furthermore, as shown in FIG. 2, the agricultural sprayer 10 may include one or more boom movement sensors 108. In general, the boom movement sensor(s) 108 may be configured to capture data indicative of the movement of the boom assembly 24 relative to the sprayer frame 12. In one embodiment, the boom movement sensor(s) 108 may be configured to capture data indicative of forward and aft movement of the boom assembly 24 relative to the direction of travel 18 of the sprayer 10 (typically referred to as boom whip). For example, the boom movement sensor(s) 108 may be an inertial measurement unit(s) (IMU(s)), a strain gauge(s) and/or the like. However, in alternative embodiments, the boom movement sensor(s) 108 may be configured to capture data indicative of any other type of boom assembly movement, such as up and down movement (typically referred to as jounce), in addition to or lieu of the boom whip.

Additionally, in other embodiments, the sprayer 10 may include any other suitable sensor(s) that capture data indicative of the operation of the sprayer 10 and/or the spray quality of the agricultural fluid being dispensed in addition to or in lieu of the sensors 102, 104, 106, 108.

Figure 3:
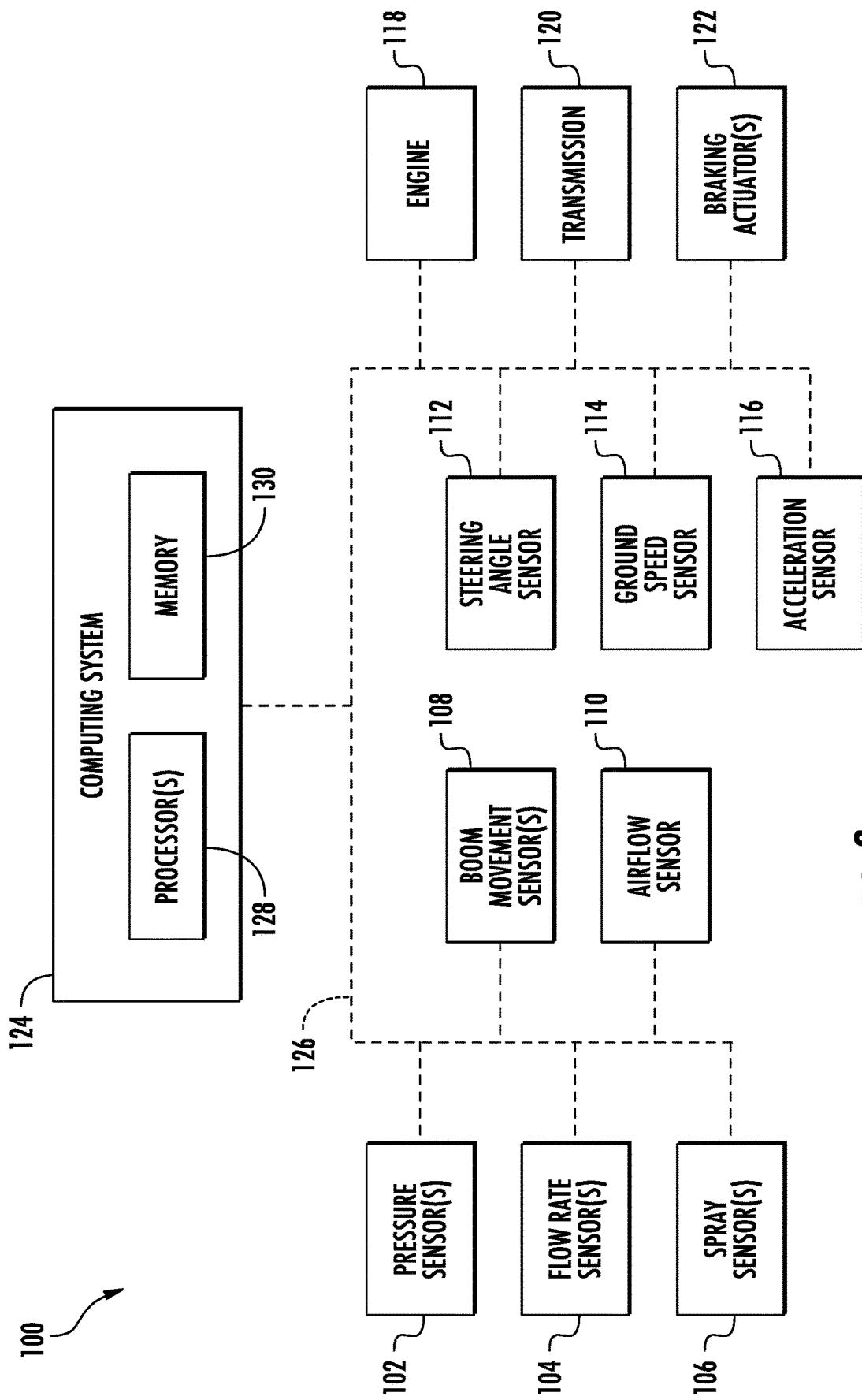
FIG. 3 illustrates a schematic view of one embodiment of a system for controlling the ground speed of an agricultural sprayer in accordance with aspects of the present subject matter.

Referring now to FIG. 3, a schematic view of one embodiment of a system 100 for controlling the ground speed of an agricultural sprayer is illustrated in accordance with aspects of the present subject matter. In general, the system 100 will be described herein with reference to the agricultural sprayer 10 described above with reference to FIGS. 1 and 2. However, it should be appreciated by those of ordinary skill in the art that the disclosed system 100 may generally be utilized with agricultural sprayers having any other suitable sprayer configuration.

As shown in FIG. 3, the system 100 may include various sensors that capture data indicative of the operation of the sprayer 10 and/or the quality of the spraying operation being performed by the sprayer 10, such as the sensors 102, 104, 106, 108. Additionally, the system 100 may include an airspeed sensor 110 of the sprayer 10. In general, the airspeed sensor 110 may be configured to capture data indicative of the airspeed of the air flowing past the boom assembly 24 as the sprayer 10 travels in the direction of travel 18. The airspeed data may account for the flow of the air over the boom assembly 24 caused by both the wind and the movement of the sprayer 10 across the field. For example, the airspeed sensor 110 may correspond to a pitot tube, an anemometer, and/or the like. In addition, the system 100 may include any other suitable sensor(s) for capturing data indicative of one or more other weather parameters.

Moreover, in several embodiments, the system 100 may include a steering angle sensor 112. In general, the steering angle sensor 112 may be configured to capture data indicative of the steering angle of the sprayer 10. Such steering angle data may, in turn, indicative of the turning radius of the sprayer 10. For example, the steering angle sensor 112 may correspond to a Hall Effect sensor provided in operative association with a steering actuator or assembly (not shown) of the sprayer 10.

Furthermore, in several embodiments, the system 100 may include a ground speed sensor 114. In general, the ground speed sensor 114 may be configured to capture data indicative of the ground speed at which the sprayer 10 is traveling across the field. For example, the ground speed sensor 114 may correspond to a Hall Effect sensor provided in operative associated with one of the wheels 14, 16 or a transmission output shaft (not shown), a GPS receiver or other location/positioning sensor (not shown), and/or the like.

Additionally, in some embodiments, the system 100 may include a sprayer acceleration sensor 116. In general, the sprayer acceleration sensor 116 may be configured to capture data indicative of the acceleration or deceleration of the sprayer 10. For example, the sprayer acceleration sensor 116 may correspond to an accelerometer, a Hall Effect sensor provided in operative associated with one of the wheels 14, 16 or a transmission output shaft, and/or the like. In one embodiment, the ground speed sensor 114 and the sprayer acceleration sensor 116 may be correspond to the same sensing device or sensor assembly.

Furthermore, the system 100 may include one or more devices of the sprayer 10 (or a work vehicle towing the sprayer 10) that are configured to adjust the ground speed at which the sprayer 10 is traveling across the field. For example, the system 100 may include an engine 118 and a transmission 120 of the sprayer 10 (or a work vehicle towing the sprayer 10). In general, the engine 118 may be configured to generate power by combusting or otherwise burning a mixture of air and fuel. The transmission 120 may, in turn, be operably coupled to the engine 118 and may provide variably adjusted gear ratios for transferring the power generated by the engine to the driven wheels 16. For example, increasing the power output by the engine 118 (e.g., by increasing the fuel flow to the engine 118) and/or shifting the transmission 120 into a higher gear may increase the ground speed at which the sprayer 10 moves across the field. Conversely, decreasing the power output by the engine 118 (e.g., by decreasing the fuel flow to the engine 118) and/or shifting the transmission 120 into a lower gear may decrease the ground speed at which the sprayer 10 moves across the field.

In addition, the system 100 may include one or more braking actuators 122 of the sprayer 10 (or a work vehicle towing the sprayer 10). In general, when activated, the braking actuator(s) 122 may reduce the speed at which the sprayer 10 moves across the field, such as by converting energy associated with the movement of the sprayer 10 into heat. For example, in one embodiment, the braking actuator(s) 122 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, in alternative embodiments, the braking actuator(s) 122 may any other suitable hydraulic, pneumatic, mechanical, and/or electrical component(s) configured to convert the rotation of the rotating element(s) into heat.

In accordance with aspects of the present subject matter, the system 100 may include a computing system 124 communicatively coupled to one or more components of the sprayer 10 and/or the system 100 to allow the operation of such components to be electronically or automatically controlled by the computing system 124. For instance, the computing system 124 may be communicatively coupled to the various sensors 102, 104, 106, 108, 110, 112, 114, 116 of the system 100 via a communicative link 126. As such, the computing system 124 may be configured to receive data from the sensors 102, 104, 106, 108, 110, 112, 114, 116 that is indicative of one or more application variables associated with the operation of the sprayer 10 and/or the quality of the spraying operation being performed by the sprayer 10. Moreover, the computing system 124 may be communicatively coupled to the engine 118, the transmission 120, and/or the braking actuator(s) 122 of the sprayer 10 via the communicative link 126. In this respect, the computing system 124 may be configured to control the operation of such devices 118, 120, 122 in a manner that adjusts the ground speed at which the sprayer 10 is traveling across the field. Additionally, the computing system 124 may be communicatively coupled to any other suitable components of the sprayer 10 and/or the system 100.

In general, the computing system 124 may comprise one or more processor-based devices, such as a given controller or computing device or any suitable combination of controllers or computing devices. Thus, in several embodiments, the computing system 124 may include one or more processor(s) 128 and associated memory device(s) 130 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 130 of the computing system 124 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 130 may generally be configured to store suitable computer-readable instructions that, when implemented by the processor(s) 128, configure the computing system 124 to perform various computer-implemented functions, such as one or more aspects of the methods and algorithms that will be described herein. In addition, the computing system 124 may also include various other suitable components, such as a communications circuit or module, one or more input/output channels, a data/control bus and/or the like.

The various functions of the computing system 124 may be performed by a single processor-based device or may be distributed across any number of processor-based devices, in which instance such devices may be considered to form part of the computing system 124. For instance, the functions of the computing system 124 may be distributed across multiple application-specific controllers or computing devices, such as a navigation controller, an engine controller, a transmission controller, a braking system controller, a spray controller, and/or the like.

Figure 4:
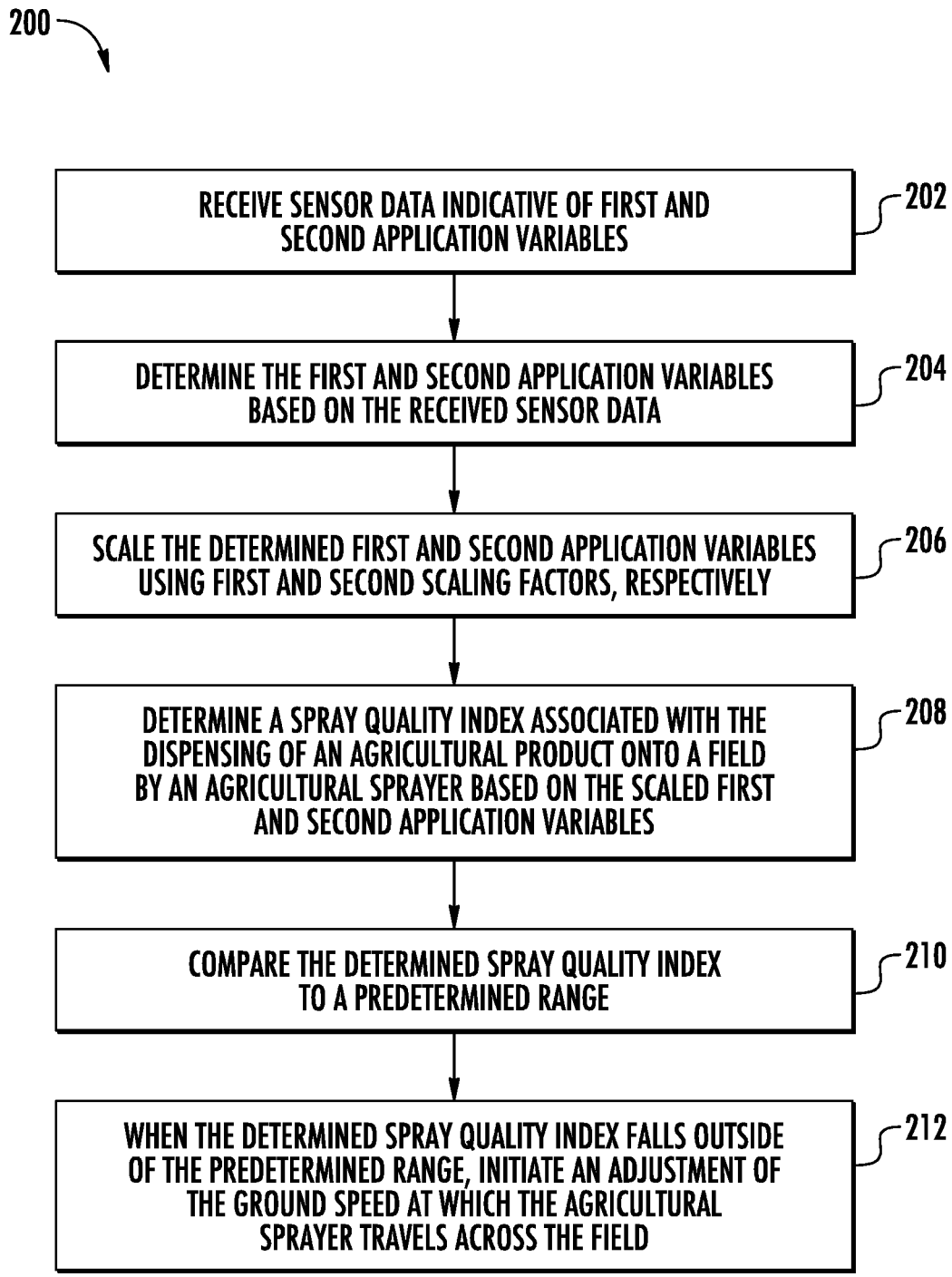
FIG. 4 illustrates a flow diagram providing one embodiment of example control logic for controlling the ground speed of an agricultural sprayer in accordance with aspects of the present subject matter.

Referring now to FIG. 4, a flow diagram of one embodiment of example control logic 200 that may be executed by the computing system 124 (or any other suitable computing system) for controlling a ground speed of an agricultural sprayer is illustrated in accordance with aspects of the present subject matter. Specifically, the control logic 200 shown in FIG. 4 is representative of steps of one embodiment of an algorithm that can be executed to adjust the ground speed of an agricultural sprayer in a manner that improves the quality of a spraying operation while maximizing the ground speed of the sprayer. Thus, in several embodiments, the control logic 200 may be advantageously utilized in association with a system installed on or forming part of an agricultural sprayer to allow for real-time ground speed control without requiring substantial computing resources and/or processing time. However, in other embodiments, the control logic 200 may be used in association with any other suitable system, application, and/or the like for controlling the ground speed of a sprayer.

As shown in FIG. 4, at (202), the control logic 200 includes receiving sensor data indicative of first and second application variables. For example, as indicated above, the computing system 124 may be communicatively coupled to various sensors of the sprayer 10 and/or the system 100, such as the sensors 102, 104, 106, 108, 110, 112, 114, and/or 116, via the communicative link 126. In this respect, as the sprayer 10 travels across the field to perform a spraying operation thereon, the computing system 124 may be configured to receive sensor data indicative of various application variables associated with the operation of the sprayer 10 and/or the spraying operation.

Furthermore, at (204), the control logic 200 includes determining the first and second application variables based on the received sensor data. Specifically, the computing system 124 may be configured to determine the values of two or more application variables based on the received sensor data. For example, the computing system 124 may include a look-up table(s), suitable mathematical formula, and/or algorithms stored within its memory device(s) 130 that correlates the received sensor data to the application variables. As will be described below, the determined application variables may be used to calculate or otherwise determine a spray quality index associated with the quality of the spraying operation being performed by the sprayer 10.

The computing system 124 may be configured to determine any suitable application variables that may be used to determine the quality of the spraying operation being performed by the sprayer 10. For example, the computing system 124 may determine the pressure of the agricultural fluid based on sensor data from the pressure sensor(s) 102, the flow rate of the agricultural fluid based on the sensor data from the flow sensor(s) 104, and/or the application rate of the agricultural fluid based on the data received from the spray sensor(s) 106. Furthermore, the computing system 124 may determine a spray fan parameter(s) (e.g., spray fan width and/or shape) and/or a spray deposition parameter(s) (e.g., the density of droplets on the underlying plants or field surface) based on the data received from the spray sensor(s) 106. Additionally, the computing system 124 may determine a boom movement parameter of the sprayer 10 (e.g., boom whip and/or jounce) based on the sensor data from the boom movement sensor 108. Moreover, the computing system 124 may determine the airspeed of the air flowing over the boom assembly 24 based on the sensor data from the airflow sensor 110. In addition, the computing system 124 may determine the turning radius of the sprayer 10 based on the sensor data from the steering angle sensor 112, the ground speed of the sprayer 10 based on the sensor data from the ground speed sensor 114, and/or the acceleration/deceleration of the sprayer 10 based on the sensor data received from the acceleration sensor 116. Alternatively, the computing system 124 may determine any other suitable application variables in addition to or in lieu of any of the application variables described above.

Moreover, at (204), the computing system 124 may be configured to receive other data indicative of application variables associated with the operation of the sprayer 10 and/or the spraying operation being performed thereby. In some embodiments, the computing system 124 may receive data from an operator of the sprayer 10 (e.g., via a suitable user interface, such as one in the cab 20), a remote computing device or system (e.g., remote database server, such as one in a farm management office), and/or any other suitable source (e.g., a weather station. Such data may be indicative of or otherwise allow the computing system 124 to determine the size and/or type of the nozzles 38 installed on the boom assembly 24, a target application rate and/or spray fan size/shape, the type of agricultural fluid being dispensed during the spray operation, a weather-related parameter(s) (e.g., wind speed, wind direction, precipitation, temperature, etc.), and/or the like.

Additionally, as shown in FIG. 4, at (206), the control logic 200 includes scaling the determined first and second application variables using first and second scaling factors, respectively. In several embodiments, the computing system 124 may apply a corresponding scaling value to each of the determined application variables (e.g., the application variables determined at (204)) to convert the determined application variables into scaled integer values. For example, the computing system 124 may include a look-up table(s), suitable mathematical formula, and/or algorithms stored within its memory device(s) 130 that correlates the determined application variables to the scaled application variables.

In general, each scaling factor may be different. As such, the differing scaling factors allow the different application variables to be weighted differently when determining the spray quality index. For example, airspeed over the boom assembly 24 may have a greater effect on spray quality than the pressure of the agricultural fluid. In this respect, the scaling factor applied to the determined airspeed speed may be greater than the scaling factor applied to the determined pressure. In such instances, the determined wind speed may be greater effect on the value of the spray quality index that the determined pressure.

Furthermore, at (208), the control logic 200 includes determining a spray quality index associated with the dispensing of the agricultural fluid onto the field based on the scaled first and second application variables. Specifically, in several embodiments, the computing system 124 may calculate or otherwise determine a spray quality index value based on the scaled application variables (e.g., the variables scaled at (206)). For example, in one embodiment, the computing system 124 may average the scaled application variables to determine the spray quality index value. As such, the spray quality index may be an integer value (e.g., between one and one hundred) that represents the overall quality of the spraying operation being performed by the sprayer 10. As will be described below, the determined spray quality index may be used to control the ground speed at which the sprayer 10 travels across the field.

In addition, as shown in FIG. 4, at (210), the control logic 200 includes comparing the determined spray quality index to a predetermined range. For example, the computing system 124 may compare the determined spray quality index (e.g., the spray quality index determined at (208)) to a predetermined range. The predetermined range may, in turn, correspond to a range of spray quality index values at which the overall quality of the spraying operation is considered acceptable or desirable.

Moreover, when the determined spray quality index falls outside of the predetermined range, at (212), the control logic 200 includes initiating an adjustment of the ground speed at which the agricultural sprayer travels across the field. Specifically, in several embodiments, when the determined spray quality index falls outside of the predetermined range, the computing system 124 may control the operation of the engine 118, the transmission 120, and/or the braking actuator(s) 122 to adjust the ground speed at which the agricultural sprayer 10 travels across the field. For example, when the determined spray quality index falls below a minimum value of the predetermined range (e.g., an integer value of seventy), the quality of the spraying operation is unacceptable or undesirable. In such instances, the computing system 124 may control the operation of the engine 118, the transmission 120, and/or the braking actuator(s) 122 to reduce the ground speed of the sprayer 10. Such a reduction in ground speed may generally improve the quality of the spraying operation. Conversely, when the determined spray quality index exceeds a maximum value of the predetermined range (e.g., an integer value of ninety), the ground speed of the sprayer 10 could be faster while still maintaining acceptable or desired spray quality. In such instances, the computing system 124 may control the operation of the engine 118, the transmission 120, and/or the braking actuator(s) 122 to increase the ground speed of the sprayer 10. As such, controlling the ground speed of the agricultural sprayer 10 based on the determined spray quality may generally improve the quality of the spraying operation while maximizing the ground speed of the sprayer 10.

Additionally, in several embodiments, at (212), the computing system 124 may determine an acceleration or deceleration at which the change in the ground speed of the sprayer 10 is to be made. In general, before initiating changes in the ground speed of the sprayer 10, the computing system 124 may determine an acceleration or deceleration rate at which such ground speed change is to be made. More specifically, it is generally desirable to adjust the ground speed as quickly as possible to improve the spray quality as quickly as possible. However, changing the ground speed of the sprayer 10 too quickly (i.e., accelerating or decelerating too quickly) may cause the boom assembly 24 to whip or otherwise move forward and aft relative to the direction of travel 18 of the sprayer 10. Boom whip may further reduce spray quality. In fact, in instances when the boom assembly 24 is already moving in such a manner, large accelerations or decelerations may exacerbate such movement, thereby further degrading the spray quality. As such, the computing system 124 may determine the acceleration or deceleration rate at which the ground speed adjustment is to be made based on the current boom movement parameter (e.g., the current forward and aft movement of the boom assembly 24). For example, the computing system 124 may select an acceleration or deceleration curve for the ground speed adjustment from a plurality of acceleration and deceleration curves (which may be stored within its memory device(s) 130) based on the current boom movement parameter. The acceleration/deceleration rate may be determined or selected to complete the desired ground speed adjustment as quickly as possible without causing excessive or additional forward and aft movement of the boom that further degrades spray quality. In embodiments in which the boom movement parameter is an application variable (e.g., determined at (204)), the computing system 124 may have already determined this value. Alternatively, in embodiments in which the boom movement parameter is not an application variable (e.g., not determined at (204)), the computing system 124 may determine this value based on data received from the boom movement sensor 108 (e.g., at (212)).

Figure 5:
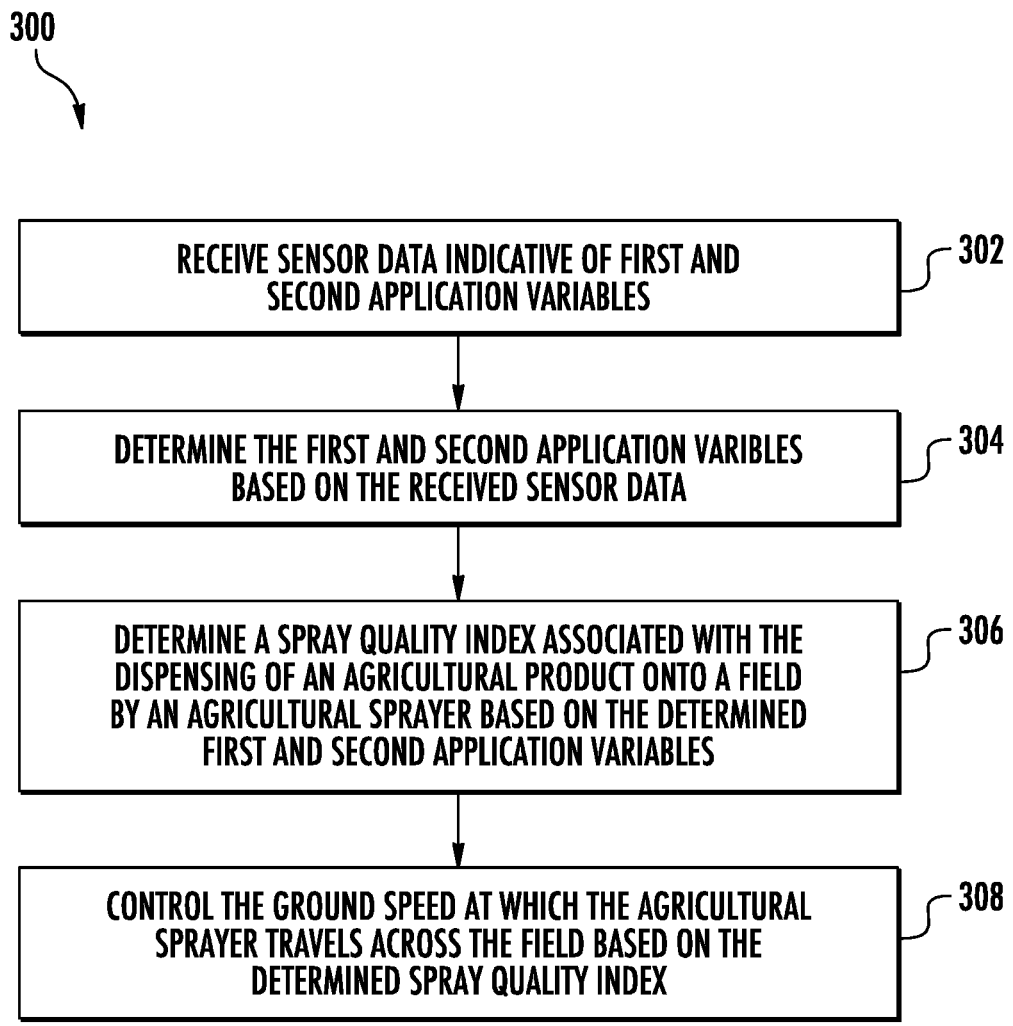
FIG. 5 illustrates a flow diagram of one embodiment of a method for controlling the ground speed of an agricultural sprayer in accordance with aspects of the present subject matter.

Referring now to FIG. 5, a flow diagram of one embodiment of a method 300 for controlling a ground speed of an agricultural sprayer is illustrated in accordance with aspects of the present subject matter. In general, the method 300 will be described herein with reference to the agricultural sprayer 10 and the system 100 described above with reference to FIGS. 1-3. However, it should be appreciated by those of ordinary skill in the art that the disclosed method 300 may generally be implemented with any agricultural sprayer having any suitable sprayer configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include receiving, with a computing system, sensor data indicative of first and second application variables. For instance, as described above, the computing system 124 may receive data from various sensors of the sprayer 10 and/or the system 100, such as the sensors 102, 104, 106, 108, 110, 112, 114, and/or 116, via the communicative link 126. Such sensor data may, in turn, be indicative various application variables associated with the operation of the sprayer 10 and/or the quality of the spraying operation being performed by the sprayer 10.

Additionally, at (304), the method 300 may include determining, with the computing system, the first and second application variables based on the received sensor data. For instance, as described above, the computing system 124 may determine various application variables based on the received sensor data.

Moreover, as shown in FIG. 5, at (306), the method 300 may include determining, with the computing system, a spray quality index associated with the dispensing of the agricultural fluid onto a field by an agricultural sprayer based on the determined first and second application variables. For instance, as described above, the computing system 124 may calculate or determine a spray quality index value associated with the dispensing of the agricultural fluid onto the field by the sprayer 10 based on the determined application variables.

Furthermore, at (308), the method 300 may include controlling, with the computing system, the ground speed at which the agricultural sprayer travels across the field based on the determined spray quality index. For instance, as described above, the computing system 124 may control the operation of the engine 118, the transmission 120, and/or the braking actuator(s) 122 of the sprayer 10 in a manner that adjust the ground speed of the sprayer 10 based on the determined spray quality index.

It is to be understood that the steps of the control logic 200 and the method 300 are performed by the computing system 124 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 124 described herein, such as the control logic 200 and the method 300, is implemented in software code or instructions which are tangibly stored on a tangible computer readable medium. The computing system 124 loads the software code or instructions via a direct interface with the computer readable medium or via a wired and/or wireless network. Upon loading and executing such software code or instructions by the computing system 124, the computing system 124 may perform any of the functionality of the computing system 124 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling a ground speed of an agricultural sprayer, the system comprising:
a boom assembly;
a nozzle supported on the boom assembly, the nozzle configured to dispense an agricultural fluid onto a field across which the agricultural sprayer is traveling;
one or more sensors configured to capture data indicative of first and second application variables; and
a computing system communicatively coupled to the one or more sensors, the computing system configured to:
determine the first and second application variables based on the data captured by the one or more sensors;
scale the determined first and second application variables using first and second scaling factors, respectively, the first scaling factor differing from the second scaling factor;
determine a spray quality index associated with the dispensing of the agricultural fluid onto the field based on the determined scaled first and second application variables; and
control the ground speed at which the agricultural sprayer travels across the field based on the determined spray quality index.

2. The system of claim 1, wherein, when controlling the ground speed at which the agricultural sprayer travels across the field, the computing system is further configured to:
compare the determined spray quality index to a predetermined range; and
when the determined spray quality index falls outside of the predetermined range, initiate an adjustment of the ground speed at which the agricultural sprayer travels across the field.

3. The system of claim 2, wherein the computing system is further configured to initiate a decrease in the ground speed at which the agricultural sprayer travels across the field when the determined spray quality index falls below a predetermined minimum value of the predetermined range.

4. The system of claim 2, wherein the computing system is further configured to initiate an increase in the ground speed at which the agricultural sprayer travels across the field when the determined spray quality index exceeds a predetermined maximum value of the predetermined range.

5. The system of claim 2, wherein the computing system is further configured to determine a boom movement parameter associated with movement of the boom assembly based on the data captured by the one or more sensors.

6. The system of claim 5, wherein, when initiating the adjustment of the ground speed at which the agricultural sprayer travels across the field, the computing system is further configured to determine an acceleration or a deceleration associated with the adjustment of the ground speed based on the determined boom movement parameter.

7. The system of claim 6, wherein, when determining the acceleration or the deceleration, the computing system is further configured to select one of a plurality of predetermined acceleration or deceleration curves based on the determined boom movement parameter.

8. The system of claim 5, wherein the movement parameter is indicative of forward and aft movement of the boom assembly along a longitudinal centerline of the agricultural sprayer.

9. The system of claim 1, wherein, when controlling the ground speed at which the agricultural sprayer travels across the field, the computing system is further configured to control an operation of at least one of an engine, a transmission, or a braking actuator of the agricultural sprayer.

10. The system of claim 1, wherein the first and second application variables comprise at least one of an application rate of the agricultural fluid, a flow rate of the agricultural fluid, a pressure of the agricultural fluid, a weather parameter, a movement parameter associated with the boom assembly, the ground speed at which the agricultural sprayer is traveling across the field, an acceleration or deceleration of the agricultural sprayer, or a turning radius of the agricultural sprayer.

11. A method for controlling a ground speed of an agricultural sprayer, the agricultural sprayer including a boom assembly and a nozzle supported on the boom assembly, the nozzle configured to dispense an agricultural fluid onto a field across which the agricultural sprayer is traveling, the method comprising:
receiving, with a computing system, sensor data indicative of first and second application variables;
determining, with the computing system, the first and second application variables based on the received sensor data;
scaling, with the computing system, the determined first and second application variables using first and second scaling factors, respectively, the first scaling factor differing from the second scaling factor;
determining, with the computing system, a spray quality index associated with the dispensing of the agricultural fluid onto the field based on the determined scaled first and second application variables; and
controlling, with the computing system, the ground speed at which the agricultural sprayer travels across the field based on the determined spray quality index.

12. The method of claim 11, wherein controlling the ground speed at which the agricultural sprayer travels across the field comprises:
comparing, with the computing system, the determined spray quality index to a predetermined range; and
when the determined spray quality index falls outside of the predetermined range, initiating, with the computing system, an adjustment of the ground speed at which the agricultural sprayer travels across the field.

13. The method of claim 12, further comprising:
initiating, with the computing system, a decrease in the ground speed at which the agricultural sprayer travels across the field when the determined spray quality index falls below a predetermined minimum value of the predetermined range.

14. The method of claim 12, further comprising:
initiating, with the computing system, an increase in the ground speed at which the agricultural sprayer travels across the field when the determined spray quality index exceeds a predetermined maximum value of the predetermined range.

15. The method of claim 12, further comprising:
determining, with the computing system, a boom movement parameter associated with movement of the boom assembly based on the received sensor data.

16. The method of claim 15, wherein initiating the adjustment of the ground speed at which the agricultural sprayer travels across the field comprises determining, with the computing system, an acceleration or a deceleration associated with the adjustment of the ground speed based on the determined boom movement parameter.

17. The method of claim 16, wherein determining the acceleration or the deceleration comprises selecting, with the computing system, one of a plurality of predetermined acceleration or deceleration curves based on the determined boom movement parameter.

18. The method of claim 15, wherein the movement parameter is indicative of forward and aft movement of the boom assembly along a longitudinal centerline of the agricultural sprayer.

19. The method of claim 11, wherein controlling the ground speed at which the agricultural sprayer travels across the field comprises controlling, with the computing system, an operation of at least one of an engine, a transmission, or a braking actuator of the agricultural sprayer.

20. The system of claim 1, wherein, when determining the spray quality index, the computing system is configured to average the determined scaled first and second application variables to determine the spray quality index.

* * * * *